United States Patent
Fromentoux et al.

(10) Patent No.: US 11,178,062 B2
(45) Date of Patent: Nov. 16, 2021

(54) ORCHESTRATING PHYSICAL AND VIRTUAL RESOURCES FOR DELIVERING DIGITAL CONTENTS

(71) Applicant: Orange, Paris (FR)

(72) Inventors: Gaël Fromentoux, Pleumeur Bodou (FR); Frédéric Fieau, Paris (FR)

(73) Assignee: ORANGE, Paris (FR)

(*) Notice: Subject to any disclaimer, the term of this patent is extended or adjusted under 35 U.S.C. 154(b) by 263 days.

(21) Appl. No.: 15/322,703

(22) PCT Filed: Jun. 11, 2015

(86) PCT No.: PCT/FR2015/051546
§ 371 (c)(1),
(2) Date: Dec. 28, 2016

(87) PCT Pub. No.: WO2016/001502
PCT Pub. Date: Jan. 7, 2016

(65) Prior Publication Data
US 2017/0142024 A1 May 18, 2017

(30) Foreign Application Priority Data
Jun. 30, 2014 (FR) ...................................... 1456200

(51) Int. Cl.
H04L 12/911 (2013.01)
H04L 29/08 (2006.01)
H04L 12/751 (2013.01)

(52) U.S. Cl.
CPC .............. *H04L 47/70* (2013.01); *H04L 45/02* (2013.01); *H04L 67/06* (2013.01); *H04L 67/10* (2013.01); *H04L 67/16* (2013.01); *H04L 67/289* (2013.01)

(58) Field of Classification Search
None
See application file for complete search history.

(56) References Cited

U.S. PATENT DOCUMENTS

| 6,061,504 A * | 5/2000 | Tzelnic | H04N 7/17318 |
| | | | 348/E5.008 |
| 2004/0064558 A1* | 4/2004 | Miyake | G06F 9/5061 |
| | | | 709/226 |

(Continued)

FOREIGN PATENT DOCUMENTS

WO  WO 2013/049079 A2  4/2013

OTHER PUBLICATIONS

Frank et al. 2013. Pushing CDN-ISP Collaboration to the Limit. *AC SIGCOMM Computer Communication Review*, 43(3).

(Continued)

*Primary Examiner* — Younes Naji
(74) *Attorney, Agent, or Firm* — Knobbe, Martens, Olson & Bear, LLP

(57) ABSTRACT

One embodiment relates to a device for resource orchestration configured to receive the following from a device for management of a digital content delivery service: a request for allocating content delivery resources and a characteristic representative of a level of service that is allocated to a provider of the content and concerning delivery of content. The device is configured to verify whether resources capable of delivering the content in compliance with the level of service characteristic are available from a determined set of resources comprising physical resources already deployed in a physical content delivery network and virtual resources already instantiated for the provider, and if it is detected that the available resources are insufficient, request the allocation of new physical resources in the physical content delivery network and/or the instantiation of new virtual resources for delivering the content.

16 Claims, 2 Drawing Sheets

(56) References Cited

U.S. PATENT DOCUMENTS

| | | | | | |
|---|---|---|---|---|---|
| 2008/0189416 | A1* | 8/2008 | Yamada | ............... | H04L 65/80 709/226 |
| 2010/0036949 | A1* | 2/2010 | Li | ..................... | H04L 67/28 709/225 |
| 2011/0280143 | A1* | 11/2011 | Li | ..................... | H04L 67/143 370/252 |
| 2012/0147894 | A1 | 6/2012 | Mulligan et al. | | |
| 2014/0012995 | A1* | 1/2014 | Zhang | ............... | H04L 41/0806 709/226 |
| 2014/0122698 | A1 | 5/2014 | Batrouni et al. | | |
| 2014/0328178 | A1* | 11/2014 | Haberland | ............ | H04W 28/08 370/235 |
| 2015/0381756 | A1* | 12/2015 | Lotfallah | ............ | H04L 67/18 709/213 |
| 2016/0006606 | A1* | 1/2016 | Zhu | .................. | H04W 24/04 370/338 |
| 2016/0285780 | A1* | 9/2016 | Strijkers | ............ | H04W 88/02 |
| 2016/0301762 | A1* | 10/2016 | Strijkers | ............ | H04L 67/322 |
| 2016/0357610 | A1* | 12/2016 | Bartfai-Walcott | .... | G06F 9/5027 |

OTHER PUBLICATIONS

European Telecommunications Standards Institute (ESTI). Jun. 2011. Telecommunications and Internet converged Services and Protocols for Advanced Networking (TISPAN): Content Delivery Network (CDN) Architecture. TS 182 019, v3.1.1 (Jun. 2011), 82 pages.
European Telecommunications Standards Institute (ESTI) Industry Specification Group. Jul. 2013. Network Function Virtualisation; Use Cases. GS NFV 009 V011 (Jul. 2013), 54 pages.
European Telecommunications Standards Institute (ESTI) Industry Specification Group. Oct. 2013. Network Functions Virtualisation (NFV); Use Cases. ETSI GS NFV 001 V1.1.1 (Oct. 2013), 50 pages.
European Telecommunications Standards Institute (ESTI) Industry Specification Group. Oct. 2013. Network Functions Virtualisation (NFV); Architectural Framework. ETSI GS NFV 002 V1.1.1 (Oct. 2013), 21 pages.
European Telecommunications Standards Institute (ESTI) Industry Specification Group. May 2014. Network Function Virtualization (NFV) Management and Orchestration. GS NFV-MAN 001 V0.5.0 (May 2014), 198 pages.
European Telecommunications Standards Institute (ESTI) Industry Specification Group. Dec. 2014. Network Functions Virtualisation (NFV); Management and Orchestration. ETSI GS NFV-MAN 001 V.1.1.1 (Dec. 2014), 184 pages.
International Search Report and Written Opinion dated Sep. 1, 2015 for International Application No. PCT/FR2015/051546 filed Jun. 11, 2015, 16 pages.
English Translation of International Search Report and Written Opinion dated Sep. 1, 2015 for Application No. PCT/FR2015/051546, filed Jun. 11, 2015.
International Preliminary Report on Patentability dated Jan. 3, 2017 for Application No. PCT/FR2015/051546, filed Jun. 11, 2015.

* cited by examiner

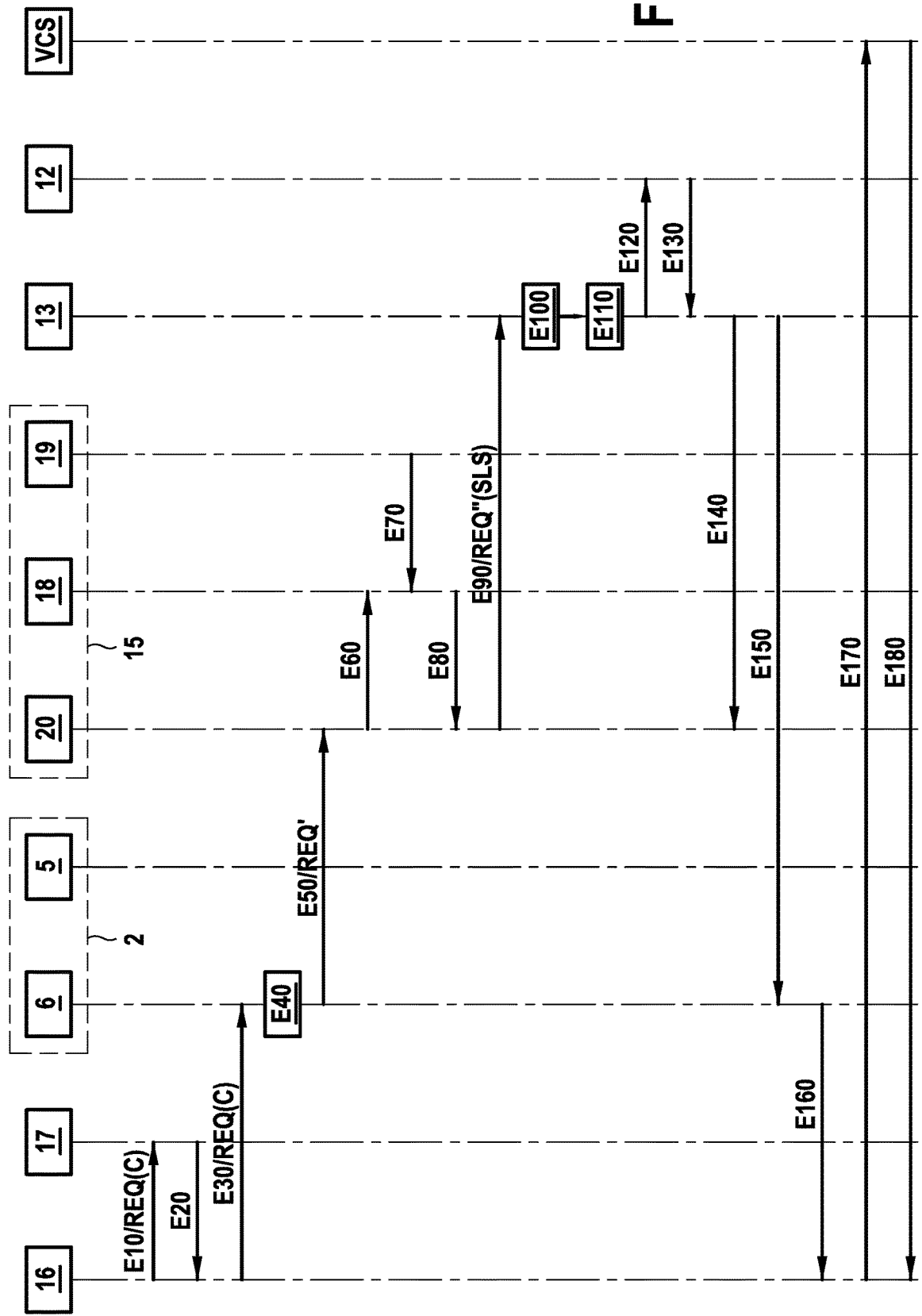

ORCHESTRATING PHYSICAL AND VIRTUAL RESOURCES FOR DELIVERING DIGITAL CONTENTS

RELATED APPLICATIONS

This application is the U.S. National Phase of Application No. PCT/FR2015/051546 entitled "ORCHESTRATION OF PHYSICAL AND VIRTUAL RESOURCES FOR DIGITAL CONTENT DELIVERY" filed Jun. 11, 2015, which designated the United States, and which claims the benefit of French Application No. 1456200 filed Jun. 30, 2014.

BACKGROUND OF THE INVENTION

The invention relates to the general field of telecommunications.

More particularly, it relates to delivering (i.e. distributing) digital contents such as video files, audio files, digital TV streams, etc., in a telecommunications network.

Given the large volumes of digital contents currently being streamed over Internet protocol (IP) telecommunications networks, and given the massive increases in traffic that results therefrom, the operators of such networks have deployed architectures that are hierarchical and organized to manage the delivery of contents by relying on various hardware resources connected in network. The term "hardware resources" covers for example storage spaces and physical content servers deployed in the network. Such architectures include for example content delivery network (CDN) architectures as described in the European telecommunications Standards Institute (ESTI) document TS 182.019 entitled "Telecommunications and Internet converged services and protocols for advanced networking (TISPAN): content delivery network (CDN) architecture", v3.1.1, June 2011. They rely on a co-operating set of components comprising in particular so-called "origin" servers on which the contents are hosted, and so-called "mirror" hardware nodes (e.g. content servers) that are geographically distributed at the borders of the network, and at which the contents are replicated. That architecture makes it possible in transparent and effective manner to distribute the contents hosted by origin servers to users by defining a routing mechanism enabling a user to be served by the mirror node of the network that is geographically the closest.

Nowadays, most of the functions used in telecommunications networks are being virtualized (or "dematerialized"), where such functions are referred to below as "telecom" functions. These telecom functions cover for example a core network, a gateway, a firewall, etc. Such virtualization is performed in particular by computer systems that are said to be "cloud systems", that implement and host the functions on virtual machines that are accessible by their clients, e.g. via a network application. Such virtual machines make use of remote computer resources and hardware networks (e.g. network connectivity, computation power, storage spaces, servers, applications, etc.), managed by the cloud computer system, and shared between its various clients as a function of their respective needs. The clients can thus access these resources in a manner that changes over time without needing to administer the often-complex underlying infrastructure for managing these resources.

Standardization bodies are presently carrying out a large amount of work to organize this major technological shift constituted by virtualizing telecom functions. Content delivery as it is presently envisaged in CDN architectures is likewise included in this effort. Thus, in the long term, content delivery may be performed not only by CDN hardware architectures as presently deployed, but also by cloud type infrastructures. By taking advantage of virtual resources offered by cloud type infrastructures, the CDN service is going to change into content delivery as a service (CDaaS) that serves not only to deliver contents, but also to increase the capacities presently on offer from CDN infrastructures by relying on cloud resources made available to users practically in real time.

Nevertheless, at present the standardization for governing the integration of such services is not very advanced, as can be seen in ESTI document GS NFV 009 v011, July 2013, entitled "Network function virtualization: use cases".

There therefore exists a need to define an architecture that makes it possible to govern the virtualization of digital content delivery functions in parallel with the already-deployed content delivery network.

OBJECT AND SUMMARY OF THE INVENTION

The invention satisfies this need in particular by proposing a hybrid architecture for delivering (i.e. distributing) digital contents that takes advantage both of the already-deployed hierarchical content delivery network (e.g. CDN type infrastructures), that rely on specific physical resources (e.g. on physical servers and/or storage spaces deployed at the edges of the network and close to the user requesting the content), and also of virtualizing content delivery functions by cloud type infrastructures that make dematerialized resources (such as virtual content servers) available to their clients in real time. This architecture proposed by the invention enables the two above-mentioned infrastructures to co-exist and to provide an appropriate response in real time to the needs of telecommunications network operators.

To this end, in order to manage the physical and virtual resources made available to users by content delivery networks and by cloud type computer systems respectively, and in order to satisfy user requests effectively, the architecture proposed by the invention relies advantageously on a plurality of entities that interact with one another, and more specifically on a device for managing a digital content delivery service and on a device for orchestrating resources for delivering such contents.

The invention thus provides a resource orchestration device comprising:
  a reception module for receiving the following from a management device of a digital content delivery service:
    a request for allocating resources for delivering at least one digital content; and
    at least one characteristic representative of a level of service that is allocated to a provider of said at least one digital content and concerning delivery of content;
  a verification module suitable for verifying whether resources capable of delivering said at least one digital content in compliance with said at least one level of service characteristic are available from a determined set of resources comprising physical resources already deployed in a physical digital content delivery network and virtual resources already instantiated for said content provider; and
  an allocation module that is activated if the verification module detects that the available resources are insufficient, the allocation module being suitable for requesting the allocation of new physical resources in the physical digital content delivery network and/or the instantiation of new virtual resources for delivering said at least one content.

Correspondingly, the invention also provides a resource orchestration method comprising:

a reception step of receiving the following from a management device of a digital content delivery service:
- a request for allocating resources for delivering at least one digital content; and
- at least one characteristic representative of a level of service that is allocated to a provider of said at least one digital content and concerning delivery of content;
- a verification step during which it is verified whether resources capable of delivering said at least one digital content in compliance with said at least one level of service characteristic are available from a determined set of resources comprising physical resources already deployed in a physical digital content delivery network and virtual resources already instantiated for said content provider; and
- if the available resources are insufficient, an allocation step of allocating new physical resources in the physical digital content delivery network and/or of instantiating new virtual resources for delivering said at least one content.

The invention also provides a management device of a digital content delivery service, the device comprising:
- an obtaining module for obtaining at least one level of service characteristic that is allocated to a digital content provider and concerning delivery of that digital content;
- a sender module for sending at least one level of service characteristic to a resource orchestration device of the invention, the resources comprising physical resources of at least one physical content delivery network and also virtual resources; and
- a sender module that is activated on receiving a request concerning delivery of at least one said digital content offered by the content provider, and suitable for sending to the orchestration device a request for allocating resources for delivering said at least one content in compliance with the level of service.

Correspondingly, the invention also provides a method of managing a digital content delivery service, the method comprising:
- a step of obtaining at least one level of service characteristic that is allocated to a digital content provider and concerning delivery of that digital content;
- a step module for sending said at least one level of service characteristic to a resource orchestration device for delivering contents, the resources comprising physical resources of at least one physical content delivery network, and also virtual resources; and
- on receiving a request concerning delivering at least one said digital content offered by the content provider, a step of sending to the orchestration device a request to allocate resources for delivering said at least one content in compliance with the level of service.

No limitation is associated with the digital contents that can be delivered by means of the invention. By way of example, they may be audio contents, video contents, files, photographs, etc.

The orchestration device and the management device of the invention thus organize (and facilitate) co-operation between one or more physical delivery networks such as CDN networks that do not conventionally rely on virtual resources but only on physical resources, and one or more computer systems that make available to a digital content provider a set of virtual resources for delivering the provider's contents. The combined action of these two devices makes it possible to manage resources offered by heterogeneous network infrastructures for delivering digital contents to users, i.e. having both physical resources such as content servers deployed at the edges of the network, and also virtual resources such as a virtual content delivery function implemented on virtual machines and reproducing a virtual content server.

The management device manages the deployment properly speaking of the content delivery service, in particular by ensuring that the delivery of digital content complies with a level of service that has been agreed or allocated beforehand to the provider of such content. This level of service is established while taking account of various factors, such as an operator policy (typically the policy of the operator of the cloud computer system), a level of service contract agreed with the content provider (known as a service level agreement (SLA)) specifying the technical requirements of the provider for delivering its contents (e.g. in terms of bandwidth, quality of service, latency, load, depending on the type of client terminal or on the expected digital contents, etc.), etc. This level of service may possibly change over time and may require a reallocation of resources for delivering the contents of the content provider.

It is transmitted by the management device to the orchestration device, which serves to allocate physical and/or virtual resources for delivering contents. The orchestration device thus acts on-the-fly in response to a request formulated by a user or by the service provider, to allocate resources for delivering content in compliance with the requirements defined by the level of service transmitted by the management device. As a function of this level of service, the orchestration device may for example give precedence to allocating physical resources deployed in the physical network for physically delivering content, or to reserving virtual resources (possibly new resources) with one or more cloud computer systems, or indeed to allocate both physical resources and virtual resources suitable for content delivery. No limitation is associated with the type of resources allocated for distributing contents: they may equally well be content servers or storage spaces or computation power, etc.

Resources are advantageously allocated in real time by the orchestration device as a function of physical and/or virtual resources already in existence and available while still retaining the possibility of reserving new virtual resources from the cloud infrastructure for use by the content provider if the resources already made available turn out to be insufficient. The action of the orchestration device thus makes it possible to take advantage of the potential for virtualizing content delivery resources as made available by the cloud infrastructure, practically in real time.

It should be observed that the invention is not limited to allocating new virtual resources. In certain contexts, the orchestration device can equally well decide to deploy new physical resources in the physical network for physical delivery and request the allocation of these new resources to the physical network for physical delivery. Although this option is complex to implement and results in a longer reaction time, it may be found to be pertinent for long-term management of the resources of the physical delivery network.

Other parameters may also be taken into account by the orchestration device when allocating resources, and in particular the geographical location of a user device (e.g. the user terminal from which the request originates) and the availability of resources in the proximity of that location in order to guarantee a content delivery service that is fast and reliable.

In a particular embodiment, the allocation module of the orchestration device is suitable for allocating new virtual resources instantiated for delivering said at least one content to the physical digital content delivery network, the orchestration device further comprising an information module for informing a processor device of the network for processing requests to access digital contents of this network about this allocation.

By way of example, the processor device may be a controller of a physical content delivery network.

In other words, in this embodiment, the invention enables the physical content delivery network that relies conventionally on physical resources to integrate virtual resources that have been instantiated by the orchestration device for delivering contents of the service provider. New resources are allocated on request for delivering these contents and they are associated with the physical content delivery network, which can take them into account as forming part of its available resources, and thus route requests from user terminals or the terminals themselves to these resources. Although they are associated with the physical content delivery network, these virtual resources nevertheless preferably continue to be managed by the orchestration device.

Conversely, in a variant embodiment, it is possible to envisage that the orchestration device associates physical resources of a physical network for physically delivering content with the computer system conventionally offering virtual resources.

In other words, by creating a gateway between the content delivery network and the orchestration device, the invention advantageously enables resources that enable contents to be delivered to "spill over" from the physical content delivery network or from the cloud computer system.

In a particular embodiment, the information module of the orchestration device is also suitable for sending to the processor device at least updating information for updating a topology of physical resources deployed in the physical content delivery network and of virtual resources allocated to said physical content delivery network, and/or for updating a routing table based on this topology.

This embodiment makes it possible on-the-fly to update the routing rules applied by the processor device to the access requests it receives, thereby facilitating and accelerating the processing of future access requests sent to the processor device, while taking account of the physical and virtual resources that have already been deployed for content delivery.

In another embodiment, the orchestration device comprises:

a module that is activated when new virtual resources are instantiated for delivering a digital content, which module is suitable for supplying said virtual resources with an identifier of a processor device for processing a request to access the digital content as sent by the terminal so that these virtual resources become registered with the processor device; and a warning module for warning the processor device of a forthcoming registration of these virtual resources with the processor device.

As mentioned above, in a particular embodiment, the processor device may be a controller of the physical network for physically delivering contents. In this embodiment, the content delivery service proposed by the invention is implemented in the perimeter of the physical content delivery network. The controller then acts as an inlet portal for admitting the access request to the hybrid architecture proposed by the invention.

Having recourse to a third party device for processing access requests, i.e. a device that is distinct from the management device and the orchestration device, advantageously makes it possible to avoid overloading the management and orchestration devices. Furthermore, the processor device may advantageously be configured to send the processing request to the management device of the content distribution service only if it detects that it cannot itself satisfy this request within the physical content delivery network.

In a variant, the access request is sent directly to the management device.

In yet another variant, the access request is sent to a cloud computer system making virtual resources orchestrated by the orchestration device available to the content provider.

Various elements for triggering resource allocation (or reallocation) by the orchestration device can be envisaged. Such trigger elements are preferably detected by the management device of the content delivery service. They are manifested by the management device of the content delivery service receiving a request associated with delivering at least one digital content. By way of example, this request may be:

a request to allocate resources for delivering a digital content requested by a user device, the request being transmitted by an access request processor device of the physical digital content delivery network;

a to allocate resources for delivery of a digital content requested by a user device, the request being transmitted by a computer system for virtualizing resources; and a request from the content provider concerning content delivery (e.g. changing a level of service, allocating more resources, etc.).

No limitation is associated with the user devices that might request content delivery. They may equally well be user terminals, such as mobile telephones, digital tablets, computers (desktop or laptop), or servers or other entities capable of communicating over a telecommunications network.

In a particular embodiment, the send module of the management device is suitable for sending data to the orchestration device containing information about a digital content requested by a user device and/or about the supplier of the content and/or about the user device, this information being extracted from a request to access the digital content as issued by the user device.

By way of example, the information may comprise a domain name for identifying the content provider, an address such as a uniform resource locator (URL) for identifying the content requested by the user device, a user agent serving to identify the type of user device seeking to access the content, or indeed an IP address specifying the user address and enabling it to be located. The information may be extracted from the header of the access request by the management device itself if the access request is sent directly thereto by the user device, or in a variant the information may be sent thereto, where applicable, by a processor device for processing the request.

The orchestration device may advantageously take account of this information while allocating resources.

In another aspect, the invention also provides a processor device for processing requests to access digital contents, the processor device comprising:

a receive module for receiving an access request coming from a user device;

a send module for sending a request to a management device of a digital content delivery service of the invention, the request being for allocation of resources for delivering the content and including information extracted from the access request about the content and/or about a provider of the content and/or about the user device;

a receive module for receiving at least information enabling the processor device to identify allocated physical resources of an physical digital content delivery network and/or virtual resources instantiated for delivering the content; and a redirection module for redirecting the access request or the user device to the resources identified for delivering the content.

Correspondingly, the invention also provides a processing method for processing requests to access digital contents by means of a processor device for processing these access requests and forming part of a physical digital content delivery network, the processing method comprising:

a step of communicating with a resource orchestration device, during which the processor device receives information from the orchestration device to the effect that the orchestration device has allocated virtual resources to the physical content delivery network for the purpose of delivering at least one said digital content; and a processing step of processing a request to access said at least one digital content received from a user device, in which step the processor device takes account of the virtual resources allocated to the physical content delivery network in order to route the access request or the user device to a resource suitable for delivering said at least one requested digital content.

The information received by the processor device of the resource orchestration device may identify directly the resources allocated by the orchestration device to the physical content delivery network for delivering contents offered by the content provider, or in a variant may relate to forthcoming registration of those resources with the processor device.

The physical content delivery network thus benefits from new virtual resources allocated by the orchestration device for delivering digital contents. By being informed about these resources, it can take them into account for routing access requests that it receives from various user devices. The resources of the physical content delivery network are thus increased virtually.

To this end, in a particular embodiment, the communications module is suitable for receiving information from the orchestration device concerning updating a topology of physical resources deployed in the physical content delivery network and of virtual resources allocated by the orchestration device to the physical content delivery network, and/or information for updating a routing table maintained by the processor device and based on this topology.

By way of example, this resource topology specifies: how the resources (e.g. content servers) are organized and arranged hierarchically within the physical content delivery network; one or more groups of these resources in a geographical zone; technical or geographical characteristics, and/or characteristics associated with the services that can be provided by these resources (e.g. server capacity, type of contents distributed by the servers or type of user devices to which they can deliver contents), etc.

This updating of the topology of resources in the routing table facilitates processing subsequently access requests sent to the processor device.

In a particular embodiment, the processor device comprises:

a verification module that is activated on receiving from a user device a request to access a said digital content, in order to verify the availability of resources allocated to the physical content delivery network for delivering the content to the user device, from among physical resources already deployed in the physical content delivery network and/or virtual resources allocated by the orchestration device to the physical content delivery network; and a sender module that is activated if the resources available in the physical content delivery network are insufficient, which module is suitable for sending a request to a management device of the invention for managing a digital content delivery service, the request being for allocation of resources for delivering the content to the user device, which request includes information data extracted from the access request from the user device and relating to the content and/or to a provider of the content and/or to the user device.

In other words, the processor device involves the management device, and optionally the allocation of virtual resources, only if it determines that the hardware resources that it manages for content delivery are insufficient to satisfy the user request.

The processor device acts as an intermediary between the user device and the management device of the content delivery service. It acts as a portal giving access to the hybrid content delivery service made available by the invention, and thus serves to avoid users directly accessing the management device and the orchestration device. Given the large volume of requests to access digital contents that are likely to be issued in a telecommunications network, this embodiment serves advantageously to avoid limiting the load on the management and orchestration devices, thereby keeping them operational.

In addition, this embodiment provides an interface to the management service that is transparent for the user device. In the embodiment where the processor device is a controller of a physical network for physical delivery, the user device continues to address the physical content delivery network in conventional manner in order to access a content, and it is the network itself that involves the management device in order to determine the resources to which the user request should be routed in order to enable the user actually to access the requested digital content.

In a particular implementation, the various steps of the orchestration method and of the management method and/or of the processing method are determined by computer program instructions.

Consequently, the invention also provides:

a computer program on a data or recording medium, the program being suitable for being implemented in an orchestration device or more generally in a computer, the program including instructions adapted to implement steps of an orchestration method as described above;

a computer program on a data or recording medium, the program being suitable for being implemented in a management device or more generally in a computer, the program including instructions adapted to implement steps of a management method as described above; and a computer program on a data or recording medium, the program being suitable for being implemented in a processor device or more generally in a computer, the program including instructions adapted to implement steps of a processing method as described above.

Each of these programs can use any programming language, and be in the form of source code, object code, or code intermediate between source code and object code, such as in a partially compiled form, or in any other describe form.

The invention also provides a computer readable data medium including instructions of a computer program as mentioned above.

The data medium may be any entity or device capable of storing the program. For example, the medium may comprise storage means, such as a read only memory (ROM), e.g. a compact disk (CD) ROM or a microelectronic circuit ROM, or indeed magnetic recording means, such as a floppy disk or a hard disk.

Furthermore, the data medium may be a transmissible medium such as an electrical or optical signal, suitable for being conveyed via an electrical or optical cable, by radio, or by other means. The program of the invention may in particular be downloaded from an Internet type network.

Alternatively, the data medium may be an integrated circuit in which the program is incorporated, the circuit being adapted to execute or to be used in the execution of the method in question.

In yet another aspect, the invention provides a distribution system for distributing digital contents, the system comprising:

at least one physical digital content delivery network having physical resources;

at least one computer system suitable for making virtual resources available to digital content providers, which resources are suitable for delivering these contents to user devices;

a management device of the invention for managing a digital content delivery service; and a resource orchestration device of the invention, suitable for allocating resources for distributing at least one said content, the resources being selected from the physical resources of the physical content delivery network and from virtual resources made available to the computer system.

In a variant embodiment, the system further comprises a processor device of the invention.

This system benefits from the same advantages as the management device, the orchestration device, and the processor device as mentioned above.

In other embodiments, it is also possible to envisage that the orchestration method, the orchestration device, the management method, the management device, the processing method, the processor device, the system, the computer programs, and the data media of the invention present in combination all or some of the above-specified characteristics.

BRIEF DESCRIPTION OF THE DRAWINGS

Other characteristics and advantages of the present invention appear from the following description made with reference to the accompanying drawings which show an embodiment having no limiting character.

In the figures:

FIG. 3 shows the exchanges between the various entities of the FIG. 1 delivery system and the main steps of the orchestration method of the invention, in a particular implementation.

DETAILED DESCRIPTION OF THE INVENTION

Figure 1:
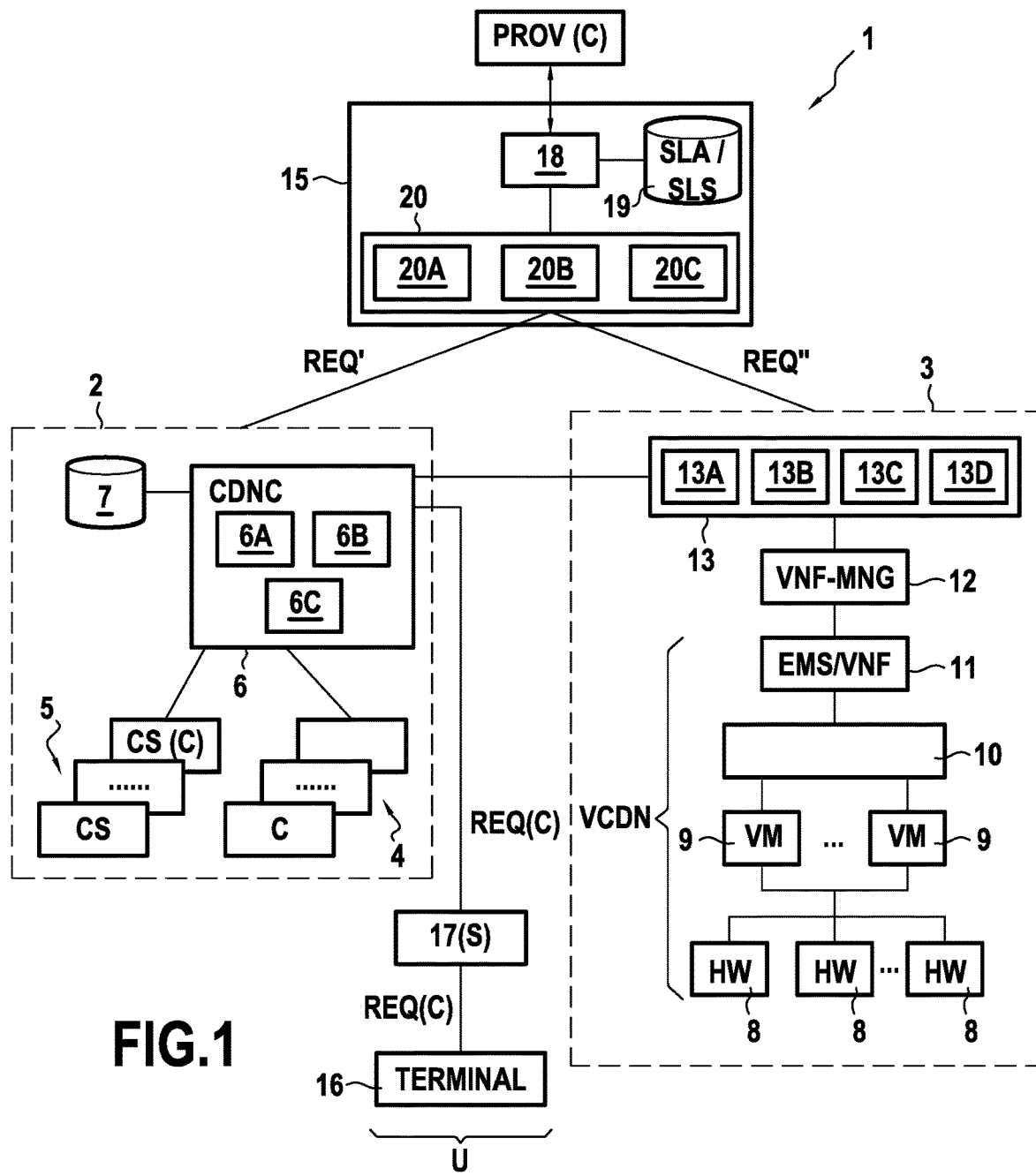
FIG. 1 shows, in its environment, a digital content delivery system in accordance with the invention in a particular embodiment.

FIG. 1 shows, in its environment, a system 1 offering a service S of delivering digital contents C in accordance with the invention, in a particular embodiment.

No limitation is associated with the nature of the digital contents C that can be distributed or delivered by the system 1. By way of example, they may comprise audio contents, video contents, files, photographs, etc. made available by one or more content providers PROV.

As mentioned above, the invention proposes a hybrid digital content delivery architecture for the system 1, relying both on physical resources deployed in one or more physical hierarchical content delivery networks 2 and on resources that are virtual, i.e. dematerialized, and that are administered and made available by one or more computer systems 3. For simplification purposes, consideration is given herein to a single physical content delivery network 2 and to a single cloud computer system 3.

In the example shown in FIG. 1, the physical content delivery network 2 is a network of the CDN type. In a variant, the physical content delivery network 2 could be any type of infrastructure having delivery servers, such as for example an infrastructure of the "mirroring" type, of the P4P type combining one or more CND networks with peer-to-peer (P2P) communication, or a caching network. The content delivery network 2 is in particular a network that is said to be "physical", as contrasted to a network that is said to be "virtual", insofar as the network 2 initially comprises only hardware or physical resources, such as servers, and does not comprise any virtual resources.

In conventional manner, it comprises "origin" servers 4 on which the digital contents C are hosted, together with hardware nodes 5 (in this example content servers), that are geographically distributed at the borders of the network where the contents C are replicated, and from which the contents are delivered to users having requested them on their terminals. These servers 4 and 5 constitute hardware or physical resources in the meaning of the invention. No limitation is associated with the number of origin servers 4 nor with the number of content mirror servers 5 deployed in the network 2. These numbers vary in known manner as a function of implementation choices made by the operator of the network.

The routing of requests to access the contents C within the CDN network 2 is performed conventionally by a CDN network controller 6 (also known as a "CDN controller" or CDNC). This controller is suitable for routing an access request issued by a user U via a user device such a terminal as for example, to the server 5 of the CDN network 2 which is geographically the closest to that terminal. The server 5 is identified by using a routing table 7 maintained by the controller 6 and reflecting the topology of the CDN network 2 (i.e. the hierarchy of content servers of the CDN network and of other resources of that network, their technical and geographical characteristics, or indeed in terms of services (types of user devices that can be served by these servers), etc.), together with routing rules for applying to access requests received in the CDN network 2. These routing rules may rely in particular on a domain name server (DNS) system for resolving domain names into Internet addresses (universal resource locators (URLs)) identifying the appropriate servers 5 as a function of the geographical locations of the terminals.

In the presently-described embodiment, the controller 6 is also a processor device in accordance with the invention. More specifically, it is a software entity, in other words a computer program or application that is executed on a computer device or on a computer. The distinctive characteristics of such a device compared with a known CDN controller are described below.

The cloud computer system 3 in the presently-described example relies on a network function virtualization (NFV) type architecture as defined by the ETSI. It implements one or more virtual network functions (VNFs) including a virtual content delivery network (VCDN) function. The virtual functions implemented by the cloud computer system 3 may be deployed on one or more virtual machines.

It should be observed that the invention is not limited to this type of architecture, and that other architectures could equally well be envisaged, such as for example a software defined network (SDN) type architecture.

The NFV architecture is described in detail in ETSI document GS NFV 002, v1.1.1 (October 2013) entitled "Network function virtualization (NFV)—architectural framework". It is based on a layered approach (e.g. resource, network, and service layers), within which a plurality of functional blocks are defined that are deployed above the computer resources and the hardware or physical networks 8 of the cloud computer system 3. The physical resources 8 comprise calculation resources (e.g. servers), storage resources, and network resources (e.g. switches, wired or wireless links, routers, etc.).

The functional block defining the NFV architecture include in particular in the resources and network layers:

virtual machines 9 (in particular in this example virtual content servers), that are instantiated by the cloud computer system 3 as a function of the needs of its clients in order to perform virtual network functions (VNF) and a hypervisor 10. The virtual machines 9 and the hypervisor 10 contribute to a virtualization layer that provides decoupling between the VNF virtual functions and the hardware resources 8;

a management module 11 referred to as an element management system (EMS) for managing the VNF virtual network functions; and a management module 12 (referred to as a "VNF manager") for managing the life cycle of VNF functions (i.e. instantiation, updating, adaptation, termination, etc., of VND functions).

These functional blocks are described in detail in Document GS NFV 002, v1.1.1, and they are not described further herein. They are administered and managed by an orchestration device 13 situated at service layer level, and in accordance with the invention.

In addition to the conventional functions of a known orchestration device as described in ESTI document GS NFV-MAN 001 entitled "Network function virtualization (NFV)-management and orchestration", v0.2.1 (January 2014), the orchestration device 13 in this example participates in deploying the service S offered by the system 1 by orchestrating the allocation of physical resources of the CDN network 2 and/or virtual resources of the cloud computer system 3 in order to deliver a content C requested by a user U on a terminal (a user device in the meaning of the invention).

The event that triggers the allocation of resources by the orchestration device 13 within the system 1 is nevertheless not limited to processing an access request from a user for a specific content C. Specifically, the orchestration device 13 may also orchestrate the allocation or reallocation of physical resources and/or virtual resources within the system 1 in response to a request from the content provider PROV concerning the delivery of its contents in general manner or only some of its contents. Such a request may relate for example to data rate, to available bandwidth, or more generally to a quality of service that the provider seeks to obtain when delivering its contents, etc.

In the presently-described embodiment, the orchestration device 13 is a software entity that executes on a computer device or a computer 14.

Figure 2:
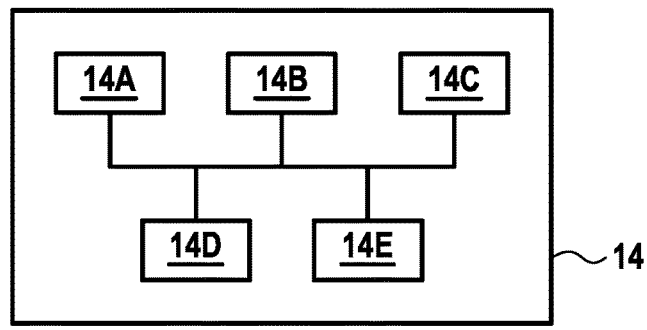
FIG. 2 shows the hardware architecture of a computer device implementing an orchestration device of the invention.

FIG. 2 is a diagram showing the hardware architecture of such a computer device 14. It comprises a processor 14A, a ROM 14B, a random access memory (RAM) 14C, a non-volatile memory 14D, and communications means 14E, suitable in particular for communicating with the controller 6 and with a management device 15 in accordance with the invention for managing the content delivery service S offered by the system 1.

The ROM 14B of the computer device 14 constitutes a data medium in accordance with the invention that is readable by the processor 14A and that stores a computer program in accordance with the invention including instructions for executing steps of an orchestration method of the invention, which steps are described below with reference to FIG. 3. In equivalent manner, the computer program defines functional modules of the orchestration device 13, and in particular a communications module 13A for communicating with the management device 15, a verification module 13B for verifying the availability of resources for digital content delivery from among the hardware resources of the CDN network 2 and/or the virtual resources made available by the cloud computer system 3, a resource allocation module 13C, and in the presently-described embodiment, an information module 13D suitable for informing the controller 6 and optionally the management device 15 about the hardware and/or software resources allocated by the orchestration device. The modules 13A and 13B rely in particular on the communications means 14E of the computer device 14. The functions of the modules 13A to 13D are described in greater detail below with reference to FIG. 3.

In the presently-described embodiment, it is assumed that the contents delivery service S offered by the system 1 is implemented within the perimeter of the CDN network 2. In other words, a user U seeking to access a content C issues an access request REQ by means of a terminal 16, e.g. by connecting to an access portal 17 giving access to the service S. The portal 17 is configured to redirect the access request REQ from the user U to the controller 6 of the CDN network 2. Depending on the way in which it is configured, the controller 6 processes the access request REQ directly within the CDN network 2, or in a variant it makes use of the management device 15, as described below.

In the presently-described embodiment, the management device 15 has two main functional units, namely:

a first unit 18 for managing service clauses, which unit acts as a "front office", or indeed as an access portal to the service S for content providers PROV. This unit 18 manages and stores in a database 19 the various service clauses that have been agreed with and/or allocated to the providers PROV for distributing their contents C. These service clauses may be linked in particular with the service offer S to which each content provider PROV subscribes with the service provider S (e.g. a premium offer). Such clauses are conventionally grouped together in documents referred to as service level agreements (SLAs). They are converted by the unit 18 into the form of technical specifications known as service level specifications (SLSs) reflecting the level (or indeed the quality) of service allocated to the content provider in question. The SLS technical specifications thus specify the criteria, in other words the technical characteristics, that the content distribution service S offered by the system 1 undertakes to satisfy when delivering contents made available by the content provider so as to guarantee the level of service allocated to the content provider, such as for example a maximum acceptable latency, a minimum bandwidth, a maximum number of users, the types of terminal involved, etc. These SLS specifications are stored in the database 19 for each content provider PROV that has subscribed to the service S, and they are stored in association with the corresponding SLAs; and a second unit 20 for the deployment, properly speaking, of the service S for distributing contents C, located in a "back office", i.e. to which the content providers PROV do not have access. This second unit 20 in this example is suitable for communicating firstly with the controller 6 of the CDN network 2, and secondly with the orchestration device 13 in order to organize the delivery of contents offered by the content provider PROV, such as for example delivering a content C requested by the user U in a request REQ. This organization involves making use of the orchestration device 13 not only for processing individual requests for access to digital contents C issued by user devices such as the terminal 16 (via requests for allocating resources in order to deliver these specific contents C to the user devices that have requested them), but also, as mentioned above, for processing requests from the content provider PROV, e.g. in order to adapt the technical characteristics governing the delivery of its contents. These two types of request constitute requests relating to the delivery of contents (or of at least one content) in the meaning of the invention. For this purpose, the deployment unit 20 comprises modules 20A, 20B, and 20C (e.g. implemented in the form of software modules), that are respectively configured to:

where appropriate, obtain data from the controller 6 giving information about the contents C requested by the user U (e.g. URL address from which to obtain the content C) and/or about the provider of the content (e.g. the domain name where the content is situated), and/or about the terminal 16 (e.g. IP address of the terminal) as extracted from the access request REQ (cf. module 20A);

obtaining from the first unit 18 the technical characteristics representative of the level of service allocated to the provider PROV of the content C requested by the user U (cf. module 20B), or more generally when a level of service is allocated to the provider PROV for delivering its contents; and sending to the orchestration device 13 these technical characteristics together with a request REQ" for resources to be allocated to deliver the specific content C requested by the user U in compliance with the level of service allocated to the provider PROV (cf. module 20C) for delivering contents more generally from the content provider PROV. When the request REQ" specifies a specific content C requested in the access request REQ, it contains the data extracted from the header of the access request REQ and obtained by the module 20A from the controller 6. When the request relates in general manner to contents provided by the content provider PROV, it may contain information relating to all of those contents, such as for example the type of those contents, the user devices that might request the delivery of those contents, etc. The functions of the modules 20A, 20B, and 20C appear in greater detail below in the description of FIG. 3.

Like the controller 6 and the orchestration device 13, the management device 15 in this example is a software entity that executes on a computer device or a computer such as the computer device 14.

The ROM of the computer device on which the controller 6 is executed constitutes a data medium in the accordance with the invention that is readable by the processor of the computer device and that stores a computer program in accordance with the invention including instructions for executing steps of a processing method of the invention. In equivalent manner, the computer program defines functional modules of the controller 6, and in particular a communications module 6A for communicating with the management device 15 and with the orchestration device 13, a verification module 6B for verifying the availability of resources allocated to the physical content delivery network CDN 2 for delivering a content C requested in an access request REQ by a user device such as the terminal 16, and a router module 6C for routing the access request REQ or the user device 16 as a function of information received from the orchestration device and as a function of routing rules stored in the database 7. The functions of these modules 6A to 6C are described in greater detail below with reference to FIG. 3.

In similar manner, the ROM of the computer device on which the management device 15 is executed constitutes a data medium in accordance with the invention that is readable by the processor of the computer device and that stores a computer program in accordance with the invention including instructions for executing steps of a management method of the invention. The computer program defines in equivalent manner the functional modules of the above-mentioned management device 15, namely the management first unit 18, and the second unit 20 for deploying the service S, together with its associated modules 20A, 20B, and 20C. The functions of these various units and modules are described in greater detail below with reference to FIG. 3.

The main steps of the orchestration method, of the management method, and of the processing method of the invention are described below with reference to FIG. 3 in a particular implementation in which they are implemented respectively by the orchestration device 13, the management device 15, and the controller 6 of FIG. 1.

To illustrate these steps, reference is made to the exchanges that take place between the various above-mentioned elements of the system 1 for delivering a content C requested by the user U on the terminal 16 via an access request REQ, in the context of the content delivery service S offered by the system 1.

Nevertheless, as mentioned above, the orchestration of resources within the computer system 1 in accordance with the invention may be triggered by requests of types other than a request by a user to access a content, such as for example a request made by the content provider PROV seeking to modify certain technical characteristics relating to the quality or level of service in question for delivering its contents.

As mentioned above, it is assumed that the terminal 16 of the user U issues a request REQ to access a content C on the portal 17 of the service S. In its header, the request REQ contains a domain name identifying the provider of the content C, a URL address identifying the content C, and the IP address of the terminal 16 (giving in particular an indication of its geographical location), and a user agent (enabling the operating system and the type of the terminal 16 to be identified) (step E10).

In this example, the terminal 16 is redirected by the portal 17 to the controller 6 of the CDN network 2 (step E20).

As a result of this redirection, the terminal 16 of the user U issues the request REQ to the controller 6 so that it can allocate a content server 5 that is available for delivering the requested content C (step E30).

On receiving the request REQ via its communications module 6A, the controller 6 of the CDN network 2 verifies the availability of physical resources within the CDN network 2 for delivering the content C to the terminal 16 (step E40). More precisely, in this example, it uses its verification module 6B to verify the availability of a content server 5 on which the content C is replicated, on the basis of the topology of the CDN network 2 and of routing rules to be found in the routing table stored in the database 7. The location of the terminal 16 may be deduced by the controller 6 from the IP address obtained in the header of the request REQ and can be used for selecting a content server 5. This verification relies on mechanisms that are known to the person skilled in the art and not described in detail herein.

If a hardware content server 5 is available in the CDN network 2 in the proximity of the terminal 16 in order to deliver the content C thereto, the request REQ (or the terminal 16) is routed by the routing module 6C of the controller 6 to the server 5. On receiving this request, the server 5 delivers to the terminal 16 the transmitted content C, of which it holds a replica.

In contrast, if the controller 6 determines that there are no physical resources available within the CDN network 2 (e.g. in the proximity of the terminal 16), or if in more general manner the resources are in a quantity that is insufficient for delivering the content C to the terminal 16, it uses its communications module 6A to inform the management device 15 of the service S and more precisely its unit 20 for deploying the service S, and sends it a request REQ' for allocating resources for delivering the content C to the terminal 16 (step E50). This request REQ' comprises information data about the content C requested by the user U and about the terminal 16, as extracted by the controller 6 from the header of the access request REQ. In this example, this data comprises the domain name and the URL address identifying the content C, together with the IP address of the terminal 16 and its user agent.

It is assumed at this point that the operator of the CDN network 2 is a client of the service S offered by the system 1. As a result, the controller 6 knows which entity to ask (specifically the management device 15) in order to obtain the allocation of resources for delivering the content C to the terminal 16.

On the module 20A of the deployment unit 20 of the management device 15 receiving the request REQ', the unit 20 acts via its module 20B to interrogate the unit 18 for managing service clauses in order to obtain the SLS technical characteristics representative of the level of service applicable to the provider PROV of the content C (step E60). The provider PROV is identified by the unit 20 from its domain name present in the request REQ' it has received from the controller 6.

The unit 18 for managing service clauses interrogates the database 19 (step E70) and transfers to the deployment unit 20 the SLA service offer and the SLS technical characteristics representative of the level of service allocated to the content provider PROV (step E80). By way of illustration, it is assumed at this point that the content provider PROV has subscribed to a premium offer guaranteeing a broad bandwidth when delivering a content and large storage capacity.

In a variant, the SLA offer and the SLS technical characteristics may be transmitted from the unit 18 to the unit 20 in a manner that is not correlated with receiving the request REQ', e.g. following negotiation of the SLA offer between the operator of the system 1 and the content provider PROV.

On receiving this information, the module 20C of the deployment unit 20 of the management device 15 sends a request REQ" to the orchestration device 13 for allocation of resources from among the physical resources made available by the CDN network 2 and/or the virtual resources offered by the cloud computer system 3 in order to deliver the content C to the terminal 16 (step E90).

In this example, this request contains the SLS technical characteristics and the SLA service offer so that the orchestration device 13 allocates resources for delivering the content C in compliance therewith. For example, when a content delivery capacity is specified in the SLA offer, the deployment unit 20 requests the orchestration device 13 by means of the request REQ" to reserve the capacity requested by the content provider PROV for delivering the content C.

The request REQ" also contains information data extracted from the access request REQ and supplied by the controller 6 to the deployment unit 20.

On receiving the resources allocation request REQ" (via its communications module 13A), the orchestration device 13 verifies the availability of resources appropriate for delivering the digital content C to the terminal 16 in compliance with the technical characteristics for level of service that have been transmitted thereto concerning the content provider PROV (step 100). Resources are said to be "available" when they exist in a given geographical zone (i.e. the physical resources are deployed in the CDN network 2 and the virtual resources are instantiated for the region in question), and they are not in use. The verification performed by the orchestration device 13 in this example is thus verification relative to the volume of resources available and to the region in question (in other words, in this example, to the region corresponding to the geographical location of the terminal 16).

This availability is verified by the verification module 13B from a determined set of resources constituted firstly by the physical resources already deployed in the CDN network 2, and secondly by virtual resources made available to the content provider PROV by the cloud computer system 3, in other words resources that have already been instantiated. For this purpose it is assumed that the orchestration device 13 has an up-to-date overall view of the current physical resources available within the CDN network 2 and of the current virtual resources made available to the content provider PROV by the cloud computer system 3, and also of the current use being made of those resources.

The term "current" is used herein to reflect the availability and the use of these resources at the time the allocation request REQ" is processed by the orchestration device, or at an instant that is close enough to this time for the orchestration device to have in real time an overall view that is realistic of the resources that are available and in use in the networks 2 and 3.

Concerning resources of the CDN network 2, the availability of the resources may be verified by interrogating the controller 6. In a variant, when the controller 6 is configured as in the presently-described embodiment to send a resource allocation request to the management device 15 only if the physical resources needed for delivering the content C to the terminal 16 are not available, the module 13B can deduce from the fact that it has received the request REQ" that physical resources are not available in the CDN network 2.

Furthermore, since the orchestration device 13 is located in the cloud computer system 3, it has access in known manner to information about the availability of the resources instantiated for the content provider PROV.

If the orchestration device 13 detects that hardware resources are available in the CDN network 2, or that virtual resources are available in the cloud computer system 3, suitable for enabling such delivery of the content C to the mobile terminal 2, these resources are allocated to delivery of the content C.

If the orchestration device 13 detects that the resources do not exist, or more generally are not sufficient for delivering the content C to the terminal 16 while complying with the technical characteristics specified by the management device 15, the orchestration device 13 allocates new resources for delivering the content C. These may be physical resources to be deployed in the CDN network 2, and/or new virtual resources in the cloud computer system 3 (step E110). The choice of allocating either physical resources, or virtual resources, or both may depend on various criteria such as in particular an operator policy, the geographical location of the terminal 16, etc.

It should be observed that if the orchestration device 13 decides to allocate physical resources in the CDN network 2, it needs to send for this purpose a resource allocation request to the controller 6 of the CDN network 2 in order to ensure that such an allocation is possible, and to have it implemented, if so. The controller 6 is then in a position to accept immediately or to postpone for a determined delay the processing of the allocation request coming from the orchestration device 13 (including in particular the time for switching sessions). The controller 6 also takes account of the request from the orchestration device for updating the topology of its resources, and it informs the orchestration device 13.

In the example shown in FIG. 3, it is assumed that the orchestration device 13 decides to allocate new virtual resources in the cloud computer system 3 for delivering the content C offered by the provider PROV.

For this purpose, and in compliance with the NFV architecture of the cloud computer system 3, the orchestration device 13 acts via its allocation module 13C to request the management module 12 for managing the life cycle of VNF functions (i.e. the VNF manager) to create a new virtualized content delivery function located in the proximity of the terminal 16 of the user U (step E120) and in compliance with the level of service characteristics of the content provider PROV. In this example, this new function is a function of the content server VCS. It also specifies the origin server to be contacted if the content C is not available in the cloud computer system 3. It may be an origin server 4 of the CDN network 2 or it may be an origin server of the content provider PROV.

The orchestration device 13 also requests the virtualized infrastructure manager (VIM), not shown in FIG. 1, to allocate hardware resources within the cloud computer system 3 to perform this virtualized function. For this purpose, it specifies in particular the memory and storage capacities to be used.

The VIM management module then informs the orchestration device 13 of the requested allocation of hardware resources. In other words, the virtual content server function requested by the orchestration device 13 is now instantiated and operating, and the orchestration device 13 is informed of this via the VNF manager module 12 implemented in the cloud computer system 3 (step E130).

In the presently-described embodiment, the allocation module 13C of the orchestration device 13 allocates the new virtual resources that have been instantiated in this way to the CDN network 2, in other words, even though they are virtual, these resources are now to be taken into account as forming part of the resources of the CDN network 2 for delivering contents to its users, in the same manner as the physical resources already deployed in the CDN network 2.

In the presently-described embodiment, on receiving confirmation that the new virtual resources have been instantiated and are operating, the orchestration device 13 acts via its information module 13D to inform the management device 15 of the availability of new physical and/or virtual resources for delivering the digital content, where appropriate (step E140). These new resources can be used for processing future access requests.

Furthermore, the orchestration device 13, in this example likewise by using its information module 13D, informs the controller 6 of the (new or existing) virtual resources that have been allocated thereto for delivering the content C to the terminal 16 in order to enable the request REQ or the terminal 16 to be redirected by the routing module 6C of the controller 6 to those resources (step E150).

In the presently-described embodiment, the orchestration device 13 also pushes to the controller 6 a new topology for the physical content servers deployed in the CDN network 2 and for the virtual content servers instantiated by the cloud computer system 3 that are now allocated thereto. This topology includes the newly-instantiated virtual content server (VCS) function. It specifies the location of the virtualized function VCS in the hierarchy of content servers taken into consideration by the controller 6 for redirecting requests to access the contents C, and its technical characteristics (e.g. capacity), geographical characteristics, and service characteristics (e.g. type of contents delivered from this server, type of user devices served, etc.). This topology may advantageously be used by the controller 6 for processing future requests.

The routing table used by the controller 6 is also updated by the orchestration device 13 on the basis of the new topology in order to take account of the instantiation of the new virtual content server, and is transmitted to the controller 6.

The updated routing table and topology are stored in the database 7.

In a variant, the orchestration device 13 provides the controller with information enabling the controller 6 itself (e.g. using its routing module 6C) to update the topology of the resources that are allocated (now both physical and virtual), and to update the routing table on the basis of this new topology.

It should be observed that under such circumstances, the virtual resources allocated by the orchestration device 13 to the CDN network 2, even though they are still managed by the orchestration device 13, form an integral portion of the resources of the CDN network 2 for processing requests to access contents received thereby. In other words, when the controller 6 receives a request to access a content from a user and verifies the availability of the resources that are allocated thereto, it takes account of the new resources in order to process and route the requests to a suitable resource for delivering the requested content to the user.

Likewise, when the orchestration device 13 verifies the availability of resources during step E100, it takes account of the new resources that have been instantiated and made available by the computer system 3, and that are allocated to the CDN network 2.

After updating, the routing module 6C of the controller 6 redirects the request REQ or the terminal 16 to the virtual content server VCS that has just been instantiated (step E160).

The terminal 16 interrogates the virtual content server VCS in order to obtain the content C (step E170).

The content C is delivered to the terminal 16 (step E180).

In another embodiment, when new virtual resources such as a virtual content server VCS are instantiated by the orchestration device during step E110 and allocated to the CDN network 2, the virtual content server VCS is itself registered with the controller 6 on the basis of an identifier provided by the orchestration device 13. Furthermore, the orchestration device warns the controller 6 of the forthcoming registration of the virtual content server VCS. In order to perform this registration, and in order to avoid limiting the intervention of the orchestration device 13, a token or a key may be created prior to the request of the controller 6, e.g. using the time-to-live (TTL) protocol, and then supplied to the orchestration device 13. The token is subsequently presented to the controller 6 during registration by the virtual content server VCS.

In the presently-described embodiment, the orchestration of resources by the orchestration device 13 results from creating and instantiating virtual resources in the computer system 3, which virtual resources are subsequently allocated to the CDN network 2 in order to process requests to access contents that are addressed thereto by the portal 17. In other words, by means of the invention, the resources of the CDN network 2 are increased in real time in order to satisfy the request of the user U. It is possible to envisage a similar operation for the computer system 3, i.e. an extension of the virtual resources made available to the content provider PROV with physical resources of the CDN network 2 for processing a request addressed to the computer system 3.

The invention claimed is:

1. A system for distributing digital contents, the system comprising:
   a device for resource orchestration comprising a processor and a memory, said device being configured to:
   receive from a management device of a digital content delivery service:
      a request for allocating resources for delivering a digital content; and
      a level of service characteristic representative of a level of service previously allocated to a content provider of said digital content, the level of service characteristic concerning delivery of said digital content;
   in response to receiving the request for allocating the resources for delivering the digital content,
      verify whether resources capable of delivering said digital content in compliance with said level of service are available from a determined set of resources comprising physical resources already deployed in a physical digital content delivery network and virtual resources already instantiated for said content provider; and
   if the available resources are insufficient to deliver said digital content in compliance with said level of service, allocate new physical resources in the physical digital content delivery network or instantiate new virtual resources for delivering said digital content.

2. The system of claim 1, configured to allocate the new virtual resources instantiated for delivering said digital content to the physical digital content delivery network, said device for resource orchestration being further configured to inform a device for processing requests to access said digital content about the allocation of the new virtual resources.

3. The system of claim 1, configured to send to a device for processing requests to access said digital content updating information for updating a topology of physical resources deployed in the physical digital content delivery network and of virtual resources allocated to said physical digital content delivery network, and/or information for updating a routing table based on said topology.

4. The system of claim 1, wherein the device for resource orchestration is configured to request the allocation of new physical resources in the physical digital content delivery network and/or instantiate the new virtual resources for delivering said digital content as a function of a geographical location of a user device that has requested access to said digital content.

5. The system of claim 1, the system further comprising:
   the management device, wherein the management device comprises a processor and a memory and is configured to:
      obtain the level of service characteristic associated with the content provider;
      send the level of service characteristic to the device for resource orchestration; and
      on receiving a request concerning delivery of said digital content offered by the content provider, sending to said device for resource orchestration the request for allocating resources for delivering said digital content in compliance with said level of service.

6. The system of claim 5, wherein said request concerning the delivery of said digital content is a request selected from: a request to allocate resources for delivering said digital content requested by a user device, the request being transmitted by a device for processing requests to access said digital content in the physical digital content delivery network; a request to allocate resources for delivery of said digital content requested by a user device, the request being transmitted by a computer system for virtualizing resources; and a request from the content provider concerning the delivery of said digital content.

7. The system of claim 2, further comprising the device for processing requests to access digital content forms part of the physical digital content delivery network and comprises a processor and a memory, the device for processing requests to access digital content being configured to:
   communicate with the device for resource orchestration to receive information from the device for resource orchestration regarding whether the device for resource orchestration has allocated virtual resources to the physical digital content delivery network for delivery of said digital content; and
   take into account said virtual resources allocated to the physical digital content delivery network when processing a request to access said digital content received from a user device in order to route said access request or said user device to a resource that is appropriate for delivering said requested digital content.

8. The system of claim 7, wherein the device for processing requests to access said digital content is configured to receive information from the device for resource orchestration concerning updating a topology of physical resources deployed in the physical digital content delivery network and of virtual resources allocated by the device for resource orchestration to said physical digital content delivery network, and/or information for updating a routing table maintained by the device for processing requests to access said digital content and based on this topology.

9. The system according to claim 7, wherein said device for processing requests to access said digital content is further configured to:
   on receiving from the user device the request to access said digital content, verify the availability of resources allocated to the physical digital content delivery network for delivering the digital content to the user device, from among physical resources already deployed in the physical digital content delivery network and/or virtual resources allocated by the orchestration device to the physical content delivery network; and if the resources available in the physical digital content delivery network are insufficient, send a request to the management device of the digital content delivery service, the request being for allocation of resources for delivering said digital content to said user device, which the request includes information data extracted from the access request from the user device and relating to the digital content and/or to a provider of the content and/or to the user device.

10. The system of claim 1, wherein the virtual resources are made available by:
at least one computer system configured to make virtual resources available to digital content providers.

11. The system of claim 10, further comprising a device for processing requests to said access digital content, the device for processing requests to access said digital content forming part of the physical content delivery network and comprising a processor and a memory, the device for processing requests to access said digital content being configured to:
communicate with the device for resource orchestration to receive information from the device for resource orchestration regarding whether the device for resource orchestration has allocated virtual resources to the physical digital content delivery network for delivery of said digital content; and
take into account said virtual resources allocated to the physical digital content delivery network when processing a request to access said digital content received from a user device in order to route said access request or said user device to a resource that is appropriate for delivering said digital content.

12. The system of claim 11, wherein the device for processing requests to access said digital content is a controller of the physical digital content delivery network.

13. A method for distributing digital contents, the method comprising:
receiving, by a device for resource orchestration, from a management device of a digital content delivery service:
a request for allocating resources for delivering a digital content; and
a level of service characteristic representative of a level of service previously allocated to a content provider of said digital content, the level of service characteristic concerning delivery of said digital content;
in response to receiving the request for allocating resources for delivering the digital content, verifying whether resources capable of delivering said digital content in compliance with said level of service are available from a determined set of resources comprising physical resources already deployed in a physical digital content delivery network and virtual resources already instantiated for said content provider; and
if the available resources are insufficient to deliver said digital content in compliance with said level of service, allocating new physical resources in the physical digital content delivery network or instantiating new virtual resources for delivering said digital content.

14. The method of claim 13, further comprising:
obtaining, by the management device of the digital content delivery service from a database, the level of service characteristic representative of the level of service previously allocated to the content provider, the level of service characteristic concerning delivery of said digital content;
sending, by the management device, said level of service characteristic to a device for resource orchestration; and
on receiving a request concerning delivering said digital content offered by the digital content provider, sending, by the management device, to the device for resource orchestration the request to allocate the resources for delivering said digital content in compliance with said level of service, wherein the resources comprise the new physical resources of a physical digital content delivery network or the new virtual resources instantiated for delivery of said digital content.

15. The method of claim 13, further comprising:
communicating with the device for resource orchestration to receive information from the device for resource orchestration regarding whether the device for resource orchestration has allocated virtual resources to the physical digital content delivery network for the purpose of delivering said digital content; and
processing, by a device for processing requests, request to access said digital content received from a user device, taking account of said virtual resources allocated to the physical content delivery network in order to route the access request or the user device to a resource suitable for delivering said digital content.

16. A non-transitory computer readable data medium having stored thereon instructions, which when executed by a processor, cause the processor to perform a resource orchestration method comprising:
receiving from a management device of a digital content delivery service:
a request for allocating resources for delivering a digital content; and
a level of service characteristic representative of a level of service previously allocated to a content provider of said digital content, the level of service characteristic concerning delivery of said digital content;
in response to receiving the request for allocating resources for delivering the digital content,
verifying whether resources capable of delivering said digital content in compliance with said level of service are available from a determined set of resources comprising physical resources already deployed in a physical digital content delivery network and virtual resources already instantiated for said content provider; and
if available resources are insufficient to deliver said digital content in compliance with said level of service, allocating new physical resources in the physical digital content delivery network or instantiating new virtual resources for delivering said digital content.

* * * * *